United States Patent [19]
Dravnieks

[11] 3,733,791
[45] May 22, 1973

[54] HEAT TRANSFERER

[75] Inventor: Konstantins Dravnieks, Madison, Wis.

[73] Assignee: Wehr Corporation, Milwaukee, Ill.

[22] Filed: Aug. 13, 1971

[21] Appl. No.: 171,500

[52] U.S. Cl. .................................................55/390
[51] Int. Cl. ..............................................B01d 53/16
[58] Field of Search......................55/34, 181, 390; 62/94, 271; 165/7

[56] References Cited

UNITED STATES PATENTS

| | | |
|---|---|---|
| 2,792,071 | 5/1957 | Pennington ...........................55/390 |
| 3,176,446 | 4/1965 | Siggelin................................55/34 |
| 3,470,708 | 10/1969 | Weil et al. ............................55/34 |

*Primary Examiner*—Charles N. Hart
*Attorney*—John W. Michael et al.

[57] ABSTRACT

A rotary air-to-air heat transferer, which is capable of transferring both sensible and latent heat from one air stream to another, includes a heat transfer media comprised of a lattice-like support coated with a thin film of an aqueous solution of a hygroscopic material such as lithium chloride.

9 Claims, 3 Drawing Figures

PATENTED MAY 22 1973 3,733,791

Inventor
K. Dravnieks

By Joseph A. Genuquini
Attorneys

HEAT TRANSFERER

BACKGROUND OF THE INVENTION

This invention relates to air conditioning systems, and more particularly, to rotary air-to-air heat transferers therefor.

Rotary air-to-air heat transferers are well-known in the air conditioning art. They are used in air conditioning systems to remove a certain portion of the heat from one air stream, such as from the exhaust stream from a heating system, and transfer same to another air stream, such as the inlet stream to the system. By doing so, the total energy requirements for heating or cooling a building are reduced; hence, initial equipment and operating costs are also reduced. The primary component of such a heat transfer is a slowly rotating, open cylinder, commonly called a wheel, through which both the incoming and outgoing air streams are passed. This wheel carries an air-permeable material as the heat transfer media.

Prior art heat transfer wheels generally fall into two separate categories insofar as the heat transfer mechanism by which they operate are concerned, (1) those which primarily transfer sensible heat from one air stream to another and (2) those which primarily transfer moisture or latent heat from one air stream to another.

Examples of wheels falling within the first category are disclosed in U.S. Pat. Nos. 2,464,766 and 2,563,415. As disclosed in these patents, the heat transfer media is a non-hygroscopic, air permeable, highly heat-absorbent material, such as a metal wool. The metal wool extracts a large portion of the sensible heat from one air stream and releases it to another air stream. Because of the negligible latent heat transfer, the total heat transferred by these wheels is somewhat below that possible if both sensible and latent heat were transferred. Also, these wheels are ineffective for controlling humidity.

An example of wheels falling within the second category is disclosed in U.S. Pat. No. 2,700,537. Wheels of this type, commonly referred to as moisture transferers, utilize an air-permeable, liquid-absorbing, insulative material, such as excelsior, corrugated cellulose or asbestos paper, or similar filamentous material, impregnated with a hygroscopic liquid or salt solution as the heat transfer media. Since wheels of this type transfer moisture from one air stream to another, they have the capability of controlling the humidity of air being supplied by the air conditioning system, e.g., can act as a de-humidifier in a cooling system. However, these wheels generally provide poor sensible heat transfer. Since these wheels absorb moisture, systems in which they are employed generally include an auxiliary means for regenerating the hygroscopic material, i.e., relive the hydroscopic material of the absorbed moisture. For example, a heated stream of air flowing from a separate heater/blower system or from a sensible heat transferer (with or without supplemental heating) located in the main system flow, such as described in U.S. Pat. Nos. 2,700,537, 3,009,540 and 3,251,402, have been used for regeneration of the hygroscopic material. U.S. Pat. No. 3,176,446 describes another approach for regeneration wherein the wheel is washed with a fresh hygroscopic solution to displace the moisture-laden coating of hydroscopic material. Hence, these systems employ considerable auxiliary equipment to obtain a total heat transfer.

SUMMARY OF THE INVENTION

It has been found that a single wheel can be used to obtain a good total heat transfer if a lattice-like support is coated with an aqueous solution of a hygroscopic material.

A primary object of this invention is to provide a heat transfer media for air heat transfer units utilized in air conditioning systems, and method for making same, having the capability of improved total heat transfer.

Another object of this invention is to provide a rotary air-to-air heat transfer having an improved capability of transferring both sensible and latent heat.

According to this invention, the wheel for a rotary air-to-air heat transferer is packed with a heat transfer media comprised of a lattice-like support, which is permeable to the axial flow of air, with a thin film of an aqueous solution of a hygroscopic material coating the support. The support can be rigid or semi-rigid and can be made from any material which is chemically inert with respect to the liquid film, has sufficient structural integrity to withstand the force of the air stream and is wettable by the hygroscopic material. Suitable materials include metal, such as pure aluminum, silver, titanium and tantalum; porous, cellular ceramic materials, particularly alumina; graphite; glass; mineral wool and synthetic plastic materials (in the form of a knitted lattice, a porous body, random filament or the like), such as polyurethane and styrene polymers. The support has a negligible effect on the heat transfer, so there are no significant limitations on the heat transfer characteristics of the material used therefor, other than the material must be capable of operating in the thermal environment of the conditioning system without detrimental deformation.

The interstices of the support lattice can be uniformly oriented, such as a knitted material, or can be randomly oriented, such as a glass or metal wool, a cellular plastic or ceramic material and the like or, furthermore, can have a flat or curved shape. When a knitted material or a wool is used, the individual member can have a circular cross section, be ribbon-shaped or have any other configuration which provides a large surface area for exposure of the film of deliquescent material to the air stream flowing therethrough. When porous materials are use, they are preferably provided with tubular passages which are generally parallel to the axis of the air stream to minimize resistance and maximize surface contact between the film and the air stream.

The solution used to coat the support is an aqueous solution of a water-soluble, hygroscopic material capable of absorbing moisture from the air and releasing same when exposed to the environment of the air streams. Representative examples of suitable solutions include acids, such as sulfuric acid, glycols, aqueous solutions of deliquescent salts, such as lithium chloride, lithium bromide, magnesium chloride, calcium chloride, calcium bromide, zinc chloride, magnesium fluoride, aluminum fluoride, potassium acetate, potassium carbonate, potassium metaphosphate, magnesium perchlorate, phosphorous pentoxide, tin and hafnium tetrachlorides, and solutions containing mixtures of these salts, The water used in making the solution should not contain any substances which might react with either the support material or the hygroscopic material, and is preferably de-ionized or distilled.

The concentration of the solution is not particularly critical. A hydroscopic material solution is somewhat self-adjusting because it rapidly reaches an equilibrium within a wide range of temperatures and humidity conditions by either absorbing moisture from or releasing water to the air stream flowing in contact therewith.

The solution can be applied in any suitable manner capable of providing a thin film thereof on the support, such as by dipping, spraying and the like. If desired, the support can be packed into the wheel and the solution sprayed onto if after installation. In order to prevent contamination to the film and to insure good adhesion, the support is preferably treated with a suitable cleaning solution to remove any materials which may adversely react with the film solution and/or make the surface of the base material hydrophobic with respect to the solution. When a metal is used as the base material, the metal should be of high purity in order to minimize contamination to the film solution and also to reduce corrosion from substances in the air streams flowing in contact therewith.

In some cases, especially those where a synthetic material is used as the base material, it may be advantageous to precoat the base material with an organic or inorganic wetting agent, such as polyvinyl alcohol, mineral flour and the like, to improve the wettability of the surface, and hence, the coverage of the film solution. Alternatively, soluable wetting agents and/or gelling agent capable of improving the adherence of the film to the support can be added to the hygroscopic material solution.

DESCRIPTION OF THE PREFERRED EMBODIMENT

The detailed structure of a wheel assembly for a rotary air-to-air heat transferer (other than the heat transfer media) is not an essential part of this invention; therefore, only a general description of the same will be given. U.S. Pat. Nos. 2,563,415 and 2,818,934 disclose exemplary wheels which can be used for this invention. Co-pending application Ser. No. 880,544, filed Nov. 28, 1969 and assigned to the assignee of the present application, discloses a wheel assembly which is particularly adaptable to this invention. For the sake of brevity and completeness of disclosure, reference is made to the above-identified patents and co-pending application for details of the structural aspects of the wheel assembly and the associated equipment.

Figure 1:
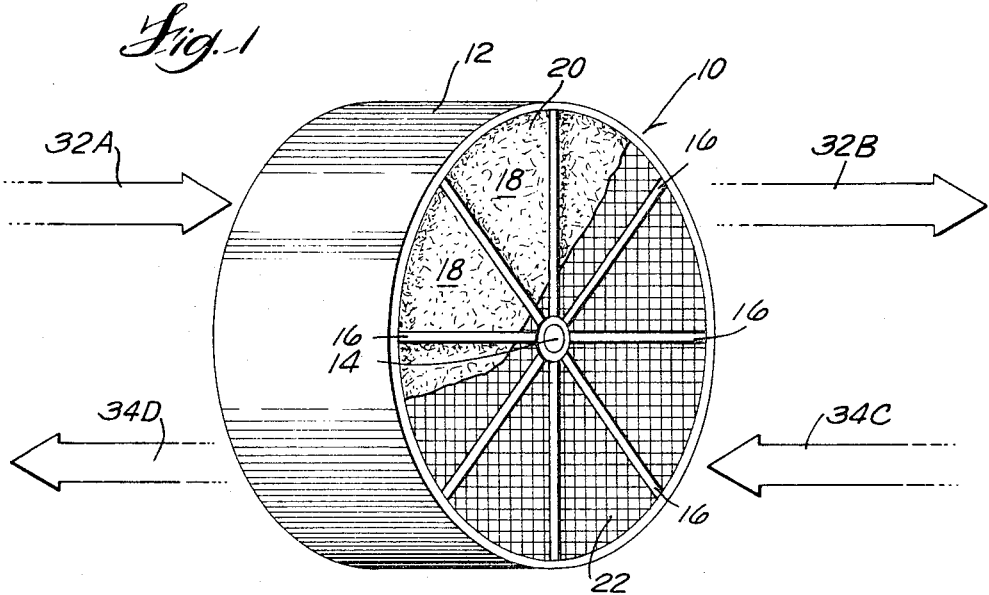
FIG. 1 is a perspective view of a wheel for a rotary air-to-air heat transferer showing the supply and return air streams of an air conditioning system in diagrammatic form.
Figure 2:
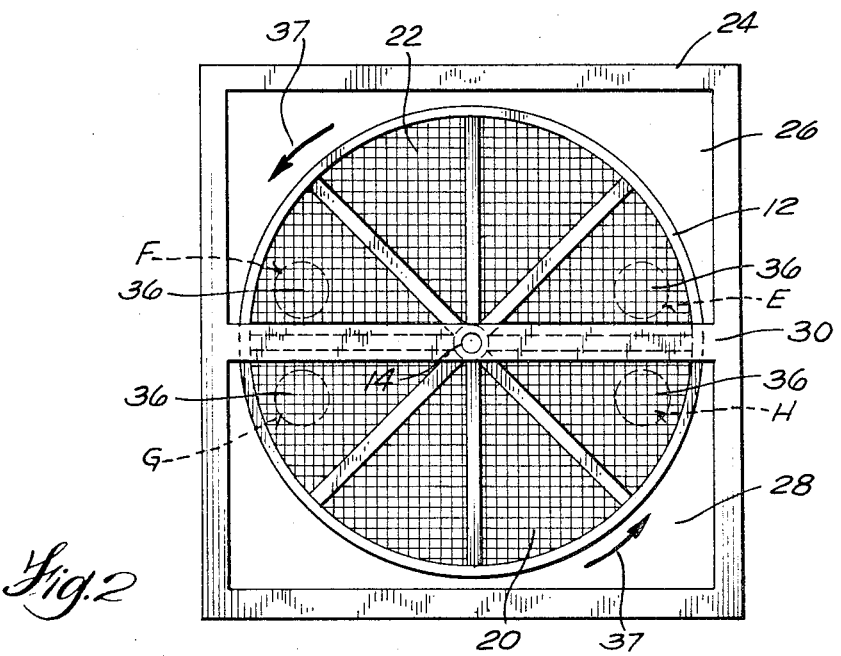
FIG. 2 is a side elevation view of a wheel of FIG. 1 showing a localized section of the heat transfer media at different positions during rotation of the wheel assembly.

Referring to FIGS. 1 and 2, reference numeral 10 generally designates a wheel assembly for a heat transferer embodying this invention. Wheel assembly 10 includes a cylindrical outer casing 12, a central hub 14 and a plurality of generally imperforate blades 16 extending outwardly from hub 14 and dividing casing 12 into a plurality of pie-shaped compartments 18. Each compartment 18 is filled with a heat transfer media 20, e.g., pure knitted aluminum fabric which has been dipped in an aqueous lithium chloride solution. Casing 12, hub 14 and blades 16 are generally about the same width in the direction parallel to the axis of rotation of wheel assembly 10. When a metal wool or similar material is used as the support lattice, heat transfer media 20 is packed into compartments 18 loosely enough to be air-permeable but compactly enough to be self-sustaining or somewhat immovable within compartments 18. In order to insure that the heat transfer media is maintained in place, a wire mesh screen 22 or the like can be secured to each face of casing 12. When the support lattice is composed of a porous or cellular material, which has passages oriented to permit axial flow of air and sufficient structural integrity to support its own weight, the imperforate blades are not required.

The support lattice heat transfer media 20 is configured to have a high surface area exposable to air streams 32A and 34C flowing therethrough so as to maximize the heat transfer between the air streams and the film of lithium chloride solution coating the support while creating a minimum pressure drop to the air. For example, a metal mesh having circular wires of about 0.008 inch diameter produces a low pressure drop. A metal mesh made from a flat, ribbon-like wire having a thickness of about 0.002, even though having a higher pressure drop than the circular wire mesh, has a substantially greater surface area per unit mass and provides a higher heat transfer efficiency.

Wheel assembly 10 is rotatably mounted in a housing or duct 24 which is separated into two air passages 26 and 28 by wall 30. As wheel assembly 10, driven by an electrical motor and axle (not shown) or similar conventional motive means operatively connected to hub 14, slowly rotates at about 4 to about 20 R.P.M., heat transfer media 20 is alternately exposed to the air streams in passages 26 and 28 which flow axially therethrough. During this rotation, the heat transfer media 20 extracts latent and sensible heat from one air stream and transfers same to the other air stream. The transfer of heat between the heat transfer media and the air streams as the wheel assembly rotates through a complete cycle will be described for the purposes of illustrating the operation of the invention.

Figure 3:
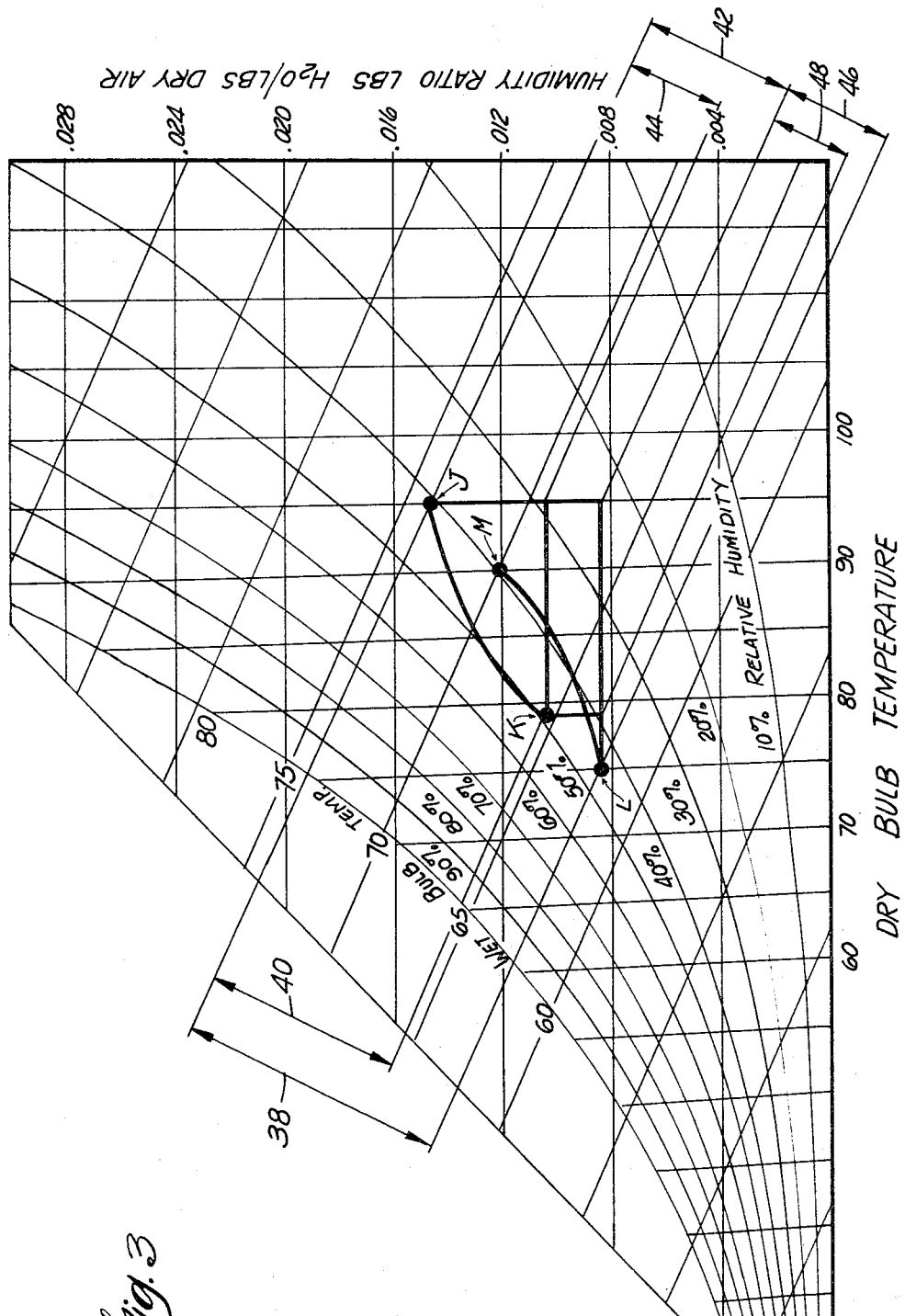
FIG. 3 is a psychrometric chart showing the thermodynamic characteristics of air streams flowing through a wheel embodying the present invention and operating in a cooling system during the summer months.

In FIG. 1, arrows 32A, 32B, 34C and 34D represent a supply air stream entering a building from outdoors through air passage 26, the same supply air stream after passing through the wheel assembly, a return air stream being exhausted from a building through air passage 28 and the same return air stream after passing through the wheel assembly, respectively. Wheel assembly 10 is filled with a knitted, high purity knitted aluminum wire mesh which was dipped in an aqueous lithium chloride solution prior to installation. In FIG. 2, a localized area of the heat transfer media is shown in phantom and designated by reference numeral 36. Various positions of this localized area while wheel assembly 10 is being rotated in the direction of arrows through the two air streams are designated by reference numerals E, F, G and H. FIG. 3 graphically illustrates the thermodynamic characteristics of the two air streams flowing through the wheel assembly.

In a typical air conditioning system, the return air stream from the building will be comparatively cool and dry, e.g., a temperature of 74.5°F. dry bulb and 61°F. wet bulb with 47 percent relative humidity, while the supply air will be hot and have a high humidity ratio, e.g., a temperature of 95°F. dry bulb and 75.5°F. wet bulb. Since only the liquid film participates in the heat transfer, only transfer of heat between the air and the lithium chloride solution on the support material will be described. At position E, where heat transfer media 36 is first moved into the incoming hot, humid air stream 32A, it is relatively cool and the concentration of the lithium chloride solution is high. Air stream 32A at this point is shown as point J in FIG. 3. Associated with this high humidity ratio of stream of 32A is a high vapor pressure. Sensible heat is transferred from the warmer air to the cooler lithium chloride solution thereby cooling the air and warming the solution. Moisture in the air is absorbed or condensed into the solution because of a vapor pressure gradient to the solution. The air becomes drier because of this loss of moisture and the solution becomes more diluted. The release of latent heat of condensation contributes to the rise of temperature to the solution.

By the time the heat transfer media 36 has reached position F, a considerable amount of sensible and latent heat has been transferred from air stream 32A to the lithium chloride solution. Outgoing air stream 32B now has a temperature of 79°F. dry bulb and 65.5°F. wet bulb with 48 percent relative humidity as shown as point K in FIG. 3. The lithium chloride solution, on the other hand, has become hotter and now contains moisture condensed from air stream 32A.

At position G, the hot lithium chloride solution containing condensed moisture is exposed to cool, relatively dry air stream 34C which is cooler and has a vapor pressure lower than the solution vapor pressure. Air stream 34C at this point is shown as point L in FIG. 3. Sensible heat is transferred from the hot solution to the cool air and the air becomes warmer while the lithium chloride solution becomes cooler. Simultaneously, water evaporates from the solution because its vapor pressure is higher than the vapor pressure of the air. The lithium chloride solution becomes more concentrated as water is evaporated.

At position H, heat transfer media 36 has lost substantially all the heat accumulated during condensation (when the air flows are balanced and the process is continuous) and the lithium chloride solution has been cooled. Air stream 34D, to which the latent heat or moisture from the lithium chloride solution has been transferred, has a temperature of 90°F. dry bulb and 71°F. wet bulb with 40 percent relative humidity, and is shown as point M in FIG. 3. The lithium chloride solution, after loosing the condensed water latent heat, is now cooler and more concentrated with a lower vapor pressure. In other words, it has conditions similar to those at the start of the cycle at position E. As the wheel rotates into position E, heat transfer media 36 is ready for another cycle.

Referring to FIG. 3, the total available heat in the system described in this example is represented by reference numeral 38 with the total heat transferred being represented by the reference numeral 40. The total latent heat is represented by reference numeral 42 with the transferred latent heat being represented by the reference numeral 44. Total sensible heat is represented by reference numeral 46 with the transferred sensible heat being represented by reference numeral 48. It can be seen that, with a heat transfer media according to this invention, i.e., a lattice-like support coated with a film of an aqueous solution of a deliquescent salt, the total heat transfer is in excess of 65 percent. Furthermore, the presence of the liquid film of deliquescent material provides the heat media of this invention with the capability of being used for humidity control.

As will be appreciated by those skilled in the art, when the above heat transferer is used in a heating system during the winter months, moisture and associated latent heat and total heat will be transferred from air stream 34C to air stream 32B thereby retaining heat and moisture (corresponding to the efficiency of the heat transferer) within the building.

I claim:
1. An air conditioning system comprising,
    means defining two separate passages for air flow,
    a single rotary air-to-air heat exchanger wheel,
    means supporting said heat exchanger wheel for rotation sequentially through said two passages,
    said heat exchanger wheel comprising
        a cylindrical, open-ended outer casing,
        a heat transfer medium filling said casing,
        said heat transfer medium consisting essentially of
            a lattice-like support distributed throughout the interior area defined by said casing and having individual members arranged to permit flow of said air streams in an axial direction therethrough with a minimum resistance; and
            a film provided as a coating on the individual members of said lattice-like support throughout the entire extent of said individual members in said casing, said film characterized by being an aqueous solution of a hygroscopic material which is capable of exchanging moisture and sensible heat with said air streams, said support being substantially chemically inert with respect to said solution and being further constructed and arranged to provide high surface contact between said film and said air streams,
    whereby said film coated lattice-like support alone in said air streams provides both sensible and latent heat transfer from the air flowing in one passage to air flowing in the other passage.
2. The heat exchanger according to claim 1 wherein said solution contains a wetting agent to enhance to wettability of the surface of said support.
3. The heat exchanger according to claim 2 wherein said support is metallic, glass or plastic material with the interstices between said individual members being uniformly oriented.
4. The heat exchanger according to claim 3 wherein said individual members have a generally circular cross section.
5. The heat exchanger according to claim 3 wherein said individual members have a flat, ribbon-like shape.
6. The heat exchanger according to claim 2 wherein said support is a metallic, glass or plastic material with the interstices between said individual members being randomly oriented.
7. The heat exchanger according to claim 6 wherein said individual members have a generally circular cross section.
8. The heat exchanger according to claim 6 wherein said individual member has a flat, ribbon-like shape.
9. The heat exchanger according to claim 7 wherein said support is a knitted pure aluminum fabric and said aqueous solution is a deliquescent salt solution of lithium chloride.

* * * * *